INVENTOR
FREEMAN H. OWENS
BY
James & Franklin
ATTORNEYS

Nov. 3, 1953

F. H. OWENS

SECURING AND DRIVING MEANS FOR ROTATABLE MAGAZINE-CONTAINED SPOOL 2,657,869

Filed June 14, 1946

2 Sheets-Sheet 2

INVENTOR

FREEMAN H. OWENS

BY

Jones & Franklin

ATTORNEYS

Patented Nov. 3, 1953

2,657,869

UNITED STATES PATENT OFFICE 2,657,869

SECURING AND DRIVING MEANS FOR ROTATABLE MAGAZINE-CONTAINED SPOOL

Freeman H. Owens, New York, N. Y.

Application June 14, 1946, Serial No. 676,703

5 Claims. (Cl. 242—54)

This invention relates to means for rotating a spool contained in a magazine which is removably placeable upon an apparatus, and to means for preventing the rotation of said spool when said magazine is not on the apparatus.

This invention has broad applicability to any apparatus in which a replaceable element is adapted to be rotated and in which rotation of the element is not desired when it is not in place on the apparatus. Parts of this invention have more specific applicability to apparatus in which a two-directionally rotatable driving means is adapted to transmit that rotation in one direction only.

Of the many applications to which this invention pertains there may be mentioned as most important motion picture cameras, motion picture projectors, photographically recorded sound track reproducers, and magnetic wire or tape reproducers. The invention is herein described and illustrated with respect to the last of these applications, and is shown in conjunction with a magnetic tape recording and reproducing apparatus the various elements of which are described with particularity in my copending application for Letters Patent, Serial No. 655,965, filed March 21, 1946. It is to be understood, however, that this apparatus has been selected by way of illustration only and the various parts thereof, except as specifically claimed herein, form no part of the present invention. On the contrary, as has above been set forth, this invention is applicable to many types of apparatus.

For convenience of operation, and particularly to eliminate the vexing operation of threading and unthreading, it is desirable in apparatus of the type described to have the film, magnetic wire or magnetic tape wound upon a pair of spools which are contained within a magazine-like structure which is adapted to be removed from or replaced upon the reproducing apparatus as a unit. While the magazine is not in place upon the apparatus, it is essential that the spools upon which, for example, the magnetic tape is wound, be non-rotatable, in order that the tape not be prematurely unwound or dethreaded therefrom. When the magazine is placed in operative position upon the reproducing apparatus, however, it is likewise essential that the spools be rotatable so that the tape may be wound upon one and simultaneously unwound from the other. In the winding and unwinding operation, it is also necessary that the spool upon which the tape is to be wound be suitably driven in rotation. It is not essential that the spool from which the tape is unwound be driven in unwinding direction, and indeed it is preferable that the unwinding spool be free to rotate at whatever speed necessary to accommodate itself to the speed at which the winding spool is driven.

It is, therefore, a prime object of the present invention to devise a magazine structure containing one or more spools rotatably mounted therein, in which rotation of the spools is prevented until such time as the magazine is in proper position on the apparatus in conjunction with which it is to be used.

It is another object of the present invention to provide a novel driving means to be used in conjunction with such a magazine so constructed that rotation of the driving means in one direction will be transmitted to the spool with which it is drivingly connected, and rotation of the driving means in the other direction will not be transmitted to that spool, the spool thus being free to rotate.

It is yet another object of the present invention to provide such a driving means which has embodied within it a friction relief of novel design so that if the spool or certain other parts of the driving means should, for any reason, not be free to rotate at the speed at which other parts of the driving means are rotating, the friction relief will slip and thus prevent damage to the equipment or any part thereof.

It is yet another object of the present invention to combine mechanism embodying the above objects into a simple, compact structure particularly adapted for use in small, home style apparatus of whatever nature desired.

To the accomplishment of the foregoing objects and such other objects as may hereinafter appear, my present invention relates to the construction of a magazine spool rotation inhibiting means and driving means as sought to be defined in the appended claims and as described in the accompanying specification taken together with the drawings, in which:

*Generic description*

Figures 1, 2, 4:
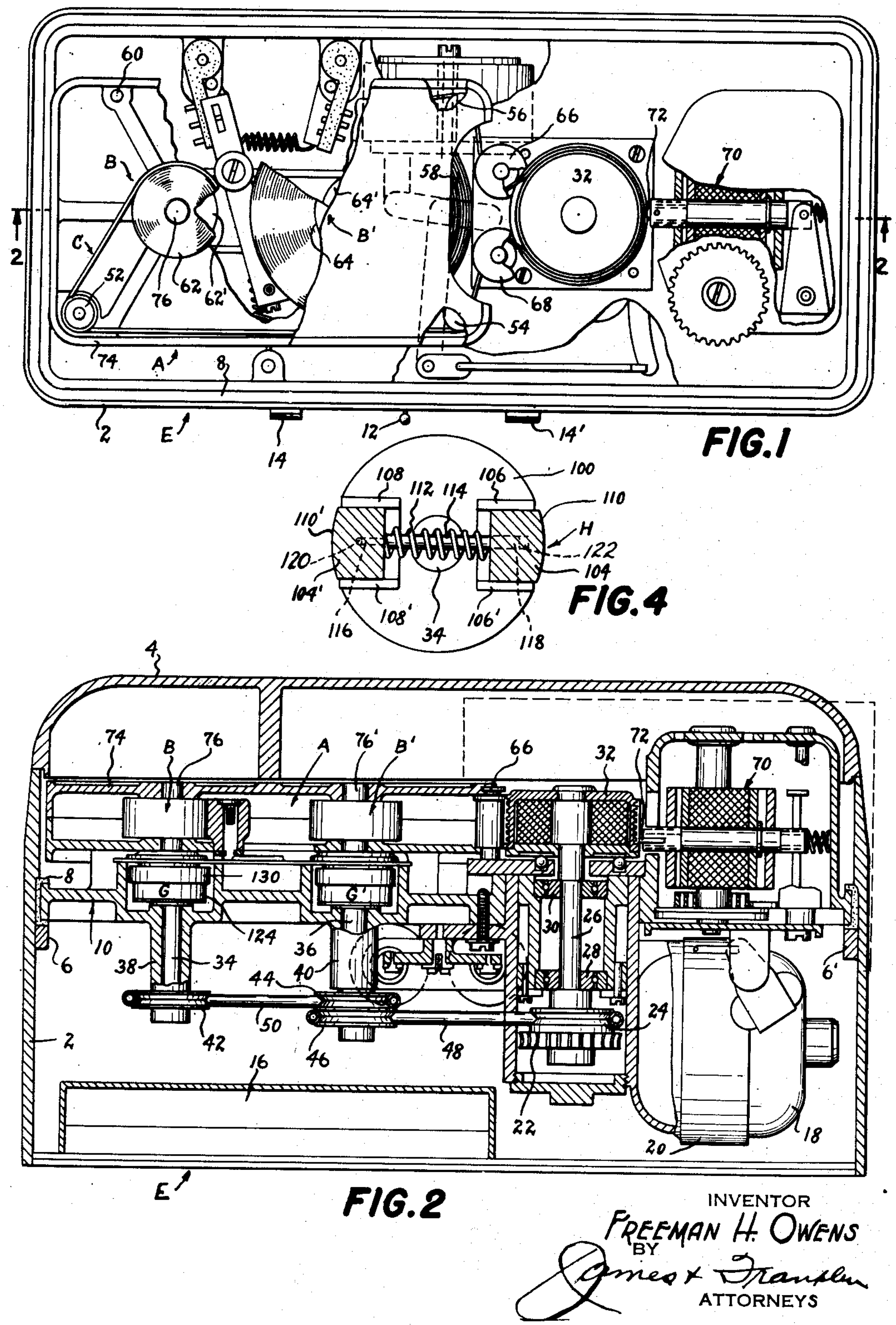
Fig. 1 is a top view, with parts broken away, of a magnetic tape recording and reproducing apparatus embodying the present invention.
Fig. 2 is a view taken along the line 2—2 of Fig. 1.
Fig. 4 is a view taken along the line 4—4 of Fig. 3.
Figure 3:
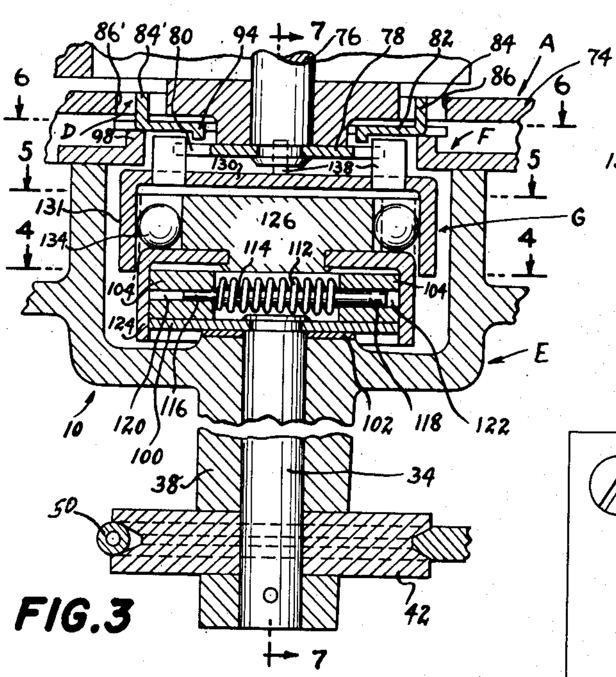
Fig. 3 is a cross-sectional view of a portion of the apparatus with a magazine properly seated thereon and showing the driving means, a portion of the spool within the magazine, and the rotation inhibiting means therefor.

Viewed in its broad aspects, my invention comprises a magazine, generally designated A, in which is housed one or more spools B, B′, upon which is wound an element C, here shown in the form of a magnetizable tape which is adapted to be wound and unwound from and between the spools B and B′. The magazine A, which is removable from and replaceable on an apparatus, generally designated E, which acts in conjunction with the tape C to record sound thereupon or reproduce the sound thus recorded, contains a rotation inhibiting means, generally designated D, which, when the magazine is not in proper position on the apparatus E, serves to inhibit or positively prevent undesired rotation of either of the spools B or B′. The apparatus E carries a releasing means, generally designated F, which is active upon the rotation inhibiting means D to render the same ineffective and thus render the spools B and B′ free to rotate with respect thereto whenever the magazine A is placed in its proper position on the apparatus E.

In order to render each of the spools B and B′ drivable in rotation in one direction and free to rotate in the other direction, a driving means G, G′ is provided engageable with the spools B, B′ when the magazine A assumes its proper position upon the apparatus E. A friction relief means H of novel design is incorporated in each of the driving means G, G′ in order to render the apparatus fool-proof in operation.

*Apparatus*

The recording and reproducing apparatus E of my invention, as herein embodied by way of illustration, comprises a chassis 2 and a vertically removable top cover therefor 4. Resting on flanges 6, 6′ extending around the interior of said chassis 2 and resiliently supported thereon by the rubber gasket 8 is a framework, generally designated 10, which supports and holds in operative relation all of the other parts of the apparatus. Appropriately placed on the chassis 2 is an access door which may, by means of handle 12, be rotated about hinges 14, 14′ so as to render accessible an inclined control panel 16 inside of the apparatus. A motor 18 is supported in housing 20 (part of which is broken away in Fig. 2) in such a manner that a worm gear attached to the motor shaft meshes in driving relation with worm wheel 22. To this wheel is attached friction pulley 24 and shaft 26, the latter being mounted in the framework 10 by means of ball bearing units 28 and 30 (see Fig. 2). At its upper extremity the shaft 26 is attached to drum 32 so that rotation of the motor 18 rotates the drum 32 in a direction and at a speed determined by the direction and speed of rotation of the motor 18.

Shafts 34 and 36 (see Fig. 2) are rotatably mounted in bushings 38 and 40 respectively and each carries at its upper end the means G, G′ for driving the spools B, B′ in rotation, the latter being so constructed, as will be described hereinafter more in detail, that rotation of the shafts 34 and 36 in one direction will be transmitted through the driving means G, G′, while rotation of said shafts 34 and 36 in the opposite direction will not be so transmitted.

Attached to the lower extremity of the shaft 34 is a friction pulley 42, and attached to the lower extremity of shaft 36 are friction pulleys 44 and 46. Friction pulley 46 is mounted coplanar with friction pulley 24, and spring belt 48 connects the two in driving relationship. Friction pulley 42 is positioned coplanar with friction pulley 44, and spring belt 50 connects the two in driving relationship.

Thus it will be apparent that rotation of the motor 18 will rotate shaft 26 by means of the worm gear and worm wheel 22, thus rotating drum 32 and friction pulley 24. By means of the spring belt 48 friction pulley 46 will be rotated thus rotating shaft 36 and friction pulley 44, and by means of spring belt 50 that rotation will in turn be transmitted to friction pulley 42 and shaft 34. All three of the shafts 26, 34 and 36 will rotate in the same direction, that direction being determined by the direction of rotation of the motor 18.

The element C, which in this embodiment is in the form of a magnetizable tape, the magnetic variations in which correspond to the sound to be reproduced, is housed in the removable magazine A and is wound on spools B and B′ therein. In passing from one spool to the next the tape passes over rollers 52, 54 and 56 (see Fig. 1). The magazine is concavely cut away at one end between the rollers 54 and 56, as at 58, in order to permit access to the tape C at that point, the point nearest the drum 32, in order that the tape C may be threaded over the drum 32.

When the magazine A is in its proper position on the apparatus, the lower ends of the spools B and B′ will be engaged in an appropriate manner by the driving means G and G′ and by the releasing means F, as hereinafter described more in detail. In order to ensure accurate positioning of the magazine A on the apparatus E and in order to ensure that when once positioned it will remain in its proper position so long as desired, the framework 10 is provided with a projecting pin 60 adapted to fit into a suitably placed orifice in the magazine A.

Each spool B, B′ may comprise two concentric discs 62, 62′ and 64, 64′, respectively, so that the ends of the tape C may be secured to the spools by being bent between said two concentric discs, in a manner well-known in the art.

Threading of the tape C over the drum 32 is accomplished as shown in Fig. 1, the tape first being threaded inwardly with respect to the two flanged guide rollers 66 and 68 and then threaded over the outer circumference of the drum 32.

With the tape C in the relative position with respect to the spools B and B′, as shown in Fig. 1, and assuming that it is desired to take up the tape on spool B, it is apparent that spool B must rotate in clockwise direction. Drum 32 must also rotate in a clockwise direction and in order for the tape C to unwind from spool B it must rotate in the same direction. If the tape C is to move past the magnetizing means, generally designated 70, and contacting means, generally designated 72, at a constant speed, as is desirable if fidelity of reproduction is to be obtained, the respective spools B and B′ must rotate at varying rotational speeds dependent upon the effective distance of the tape C from the center of said spools, that is to say, spool B as shown in Fig. 1 must rotate much more rapidly than spool B′. However, as the tape accumulates on spool B that spool must rotate at a decreased speed, and as the tape unwinds from spool B′ that spool must rotate at an increased speed, if the linear speed of motion of the tape C past the magnetizing means 70 is to remain constant.

The motor 18 is a constant-speed motor and, since it is directly geared to the drum 32, that drum will rotate at constant speed. The motion of the motor 18 is transmitted to the shafts 34 and 36, thence to the driving means G and G′ and thence to the spools B and B′ by means of spring belts 48 and 50 which drive friction pulleys 24, 46, 44 and 42, as above described. Since these spring belts 48 and 50 may slip with respect to their driven and driving friction pulleys, they will drive the spools B and B′ at varying speeds throughout the winding and unwinding of the tape C from one spool to another and thus the tape C will move in nonslipping relationship to the drum 32 and, consequently, at a constant linear speed with respect to the magnetizing means 70.

In order to further facilitate the variation in rotational speeds of the spools B and B′, the driving means G and G′ for the two spools are so constructed that they will transmit to their respective spools motions of their driving shafts only when those motions are in a direction appropriate for the winding or taking up operation of their spools but will not transmit motion in a direction suitable for unwinding, the spools B and B′ being free to rotate in such direction. Thus, the driving means G for spool B will transmit clockwise rotation of the shaft 34, so that spool B can be driven to wind tape thereon, but will not transmit counter-clockwise rotation of the shaft 34. When shaft 34 rotates in a counter-clockwise direction, the spool B is free to rotate as it wishes, being declutched from its driving shaft 34. Similarly, the driving means G′ for the spool B′ will only transmit counter-clockwise rotation of the shaft 36 to the spool B′ and when, as in the example given, the shaft 36 is rotating in a clockwise direction, the spool B′ is declutched therefrom and is free to rotate at any speed necessary to unwind the tape C therefrom. Consequently, during a winding operation, slippage need occur in the driving mechanism only with respect to the winding spool; the unwinding spool is declutched from its shaft, free to rotate, and the speed of rotation of its shaft is of no importance.

To further facilitate the variation in rotational speeds of the spools B and B′, the driving means G and G′ are each provided with friction relief means H integrally formed therewith.

For a description of the details of the magnetizing means 70 and the other structural elements of the reproducer here illustrated, reference is made to the aforementioned copending application for Letters Patent, Serial No. 655,965.

*Rotation inhibiting and releasing means*

Within the casing 74 of the magazine A are rotatably mounted a pair of spool shafts 76, 76′ upon which are mounted the spools B and B′. In the embodiment here illustrated, each of the spool shafts 76, 76′ projects slightly below the bottom of the magazine A and carries on its projecting end a disc 78 having at least one radial notch 80 at the outer periphery thereof. An annular locking disc 82 is mounted in the lower surface of the magazine A and has a pair of upwardly projecting lips 84, 84′ projecting into suitable recesses 86, 86′ in the lower surface of the magazine A so as to be non-rotatable with respect thereto. The locking disc 82 is preferably formed of sheet metal and the lips 84, 84′ may then be formed by punching portions of the sheet metal body upwardly. The central portion of the locking disc 82 is cut away as at 88 and is provided with a plurality of lugs extending perpendicular to the surface thereof, two of these lugs 90, 90′ extending upwardly into suitable recesses 92, 92′ in the magazine A and other of the lugs 94, 94′ extending downwardly so as to be receivable within the radial notches 80 in the disc 78. A pair of helical springs 96, 96′ are retained within the orifices 92, 92′ of the magazine A and resiliently urge the locking disc 82 downwardly so that the lugs 94 engage with the slots 80 and thus positively prevent rotation of the spool B, in this manner defining the rotation inhibiting means D.

The upper surface of the apparatus framework 10 has an upward projection which defines the releasing means F. This projection is here shown in the form of a ring 98 which, when the magazine A is in its proper position on the apparatus E, engages the lower surface of the locking disc 82 and raises it against the pressure of the springs 96, 96′ an amount sufficient to disengage the depending lugs 94 from the slots 80 of the disc 78 and thus render ineffective the rotation inhibiting means D, the spools being then free to rotate.

*Driving means*

The two driving means G and G′ are, insofar as the present apparatus is concerned, identical except as hereinafter specifically set forth. Consequently, only one will be described, the specific differences between the two being set forth when appropriate.

To the upper end of shaft 34 is attached a disc 100 which is rotatable over an anti-friction liner 102. Mounted upon the disc 100 are a pair of shoes 104, 104′ which are slidable over the upper surface of the disc 100 between upraised guides 106, 106′, 108, 108′ thereon in radial directions. The outer surfaces 110, 110′ of the shoes 104, 104′ are preferably circularly shaped to correspond to the curvature of the periphery of the disc 100. As the disc 100 rotates, centrifugal force urges each of the shoes 104, 104′ outwardly, this outward motion being aided and ensured by means of helical spring 112 compressed between the two shoes. In order to ensure proper positioning of the spring 112, it envelops a guide pin 114, the extremities 116 and 118 of which are slidably receivable within apertures 120 and 122 in the shoes 104′ and 104, respectively. As here illustrated, the extremity 116 is of smaller dimension than the remainder of the guide pin 114 in order to prevent the pin 114 from sliding so far into the shoe 104′ as to have its end 118 become disengaged from the shoe 104.

A cup member 124 envelops the disc 100 and the shoes 104 and 104′ in such a manner that the outer surfaces 110, 110′ of the shoes are frictionally engaged with the inner surfaces of the cup 124.

Figure 5:
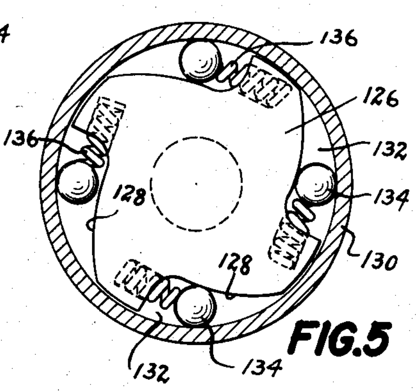
Fig. 5 is a view taken along the line 5—5 of Fig. 3.
Figure 6:
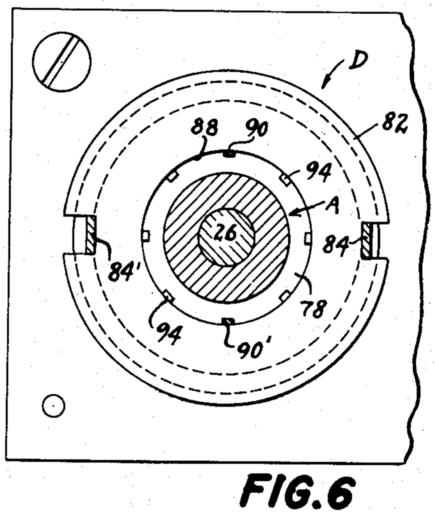
Fig. 6 is a view taken along the line 6—6 of Fig. 3.
Figure 7:
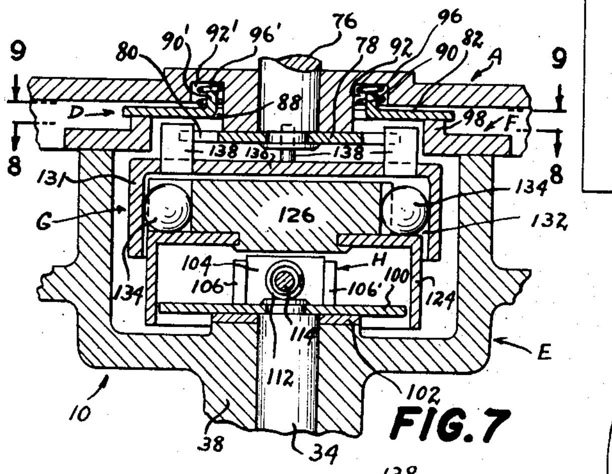
Fig. 7 is a view taken along the line 7—7 of Fig. 3.
Figure 9:
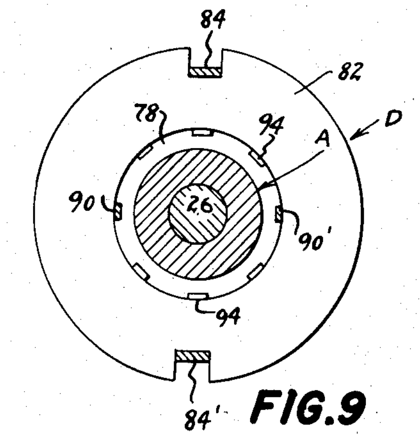
Fig. 9 is a view taken along the line 9—9 of Fig. 7.
Figure 8:
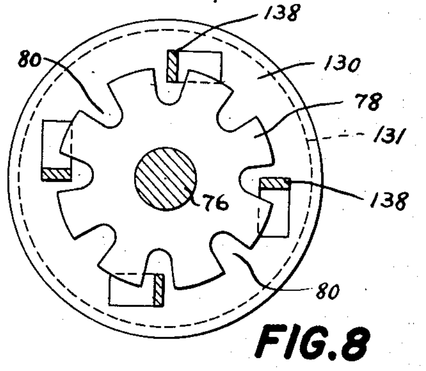
Fig. 8 is a view taken along the line 8—8 of Fig. 7.

The cup is attached to a cam 126 which is provided with a plurality of outwardly inclined side cam surfaces 128. The cam is in turn enveloped by a driven member 130, also of cup shape, between the depending cup forming flange 131 of which and the side cam surfaces 128 are defined a plurality of ball receiving spaces 132 in which balls 134 are housed. When the cam 126 of Fig. 5 is rotated in a clockwise direction, centrifugal force plus the shape of the outwardly inclined side cam surfaces 128 force the balls 134 outwardly. The balls thus wedge themselves between the cam 126 and the flange 131 of the driven member 130 so that rotation of the cam 126 is transmitted to the driven member 130. In order to ensure positive action on the part of the balls 134, helical springs 136 may be provided one end of which is housed within the cam 126 and the other end of which bears against the ball 134 to urge it outwardly along the cam surface 128.

If the cam 126 of Fig. 5 is rotated in a counterclockwise direction, the balls 134 will no longer be urged into wedging relation between the cam 126 and the driven member 130 but will instead be urged in the opposite direction. Consequently, rotation of the cam 126 will not be transmitted to the driven member 130 and the driven member 130 will thus be free to rotate.

In the apparatus as disclosed, it is with respect solely to the shape of the cam 126 that the two driving means G and G′ differ, the cam 126 for the driving means G′ being opposite in shape to that for the driving means G so that rotation in the opposite direction is transmittable therethrough.

The upper surface of the driven member 130 is provided with a plurality of fingers 138 so positioned and of such a height that when the magazine A is properly positioned upon the apparatus E, the fingers 138 are engaged within the slots 80 of the disc 78. When this engagement obtains, any rotation imparted to the driven member 130 is likewise imparted to the spool B, thereby driving the same. Conversely, whenever the driven member 130 is free to rotate with respect to the cam 126, the spool B to which it is connected is likewise free to rotate.

By the simple, compact and easily constructed mechanism above described, I have produced a driving means drivable in two directions which transmits to the spool driven thereby rotation in one direction only, the desired direction being obtained by suitable shaping of the cam 126. When the driving means rotates in the non-transmissive direction, the spool with which it is connected is free to rotate at any speed. Inherent in the driving means as thus constructed is a friction relief mechanism of novel and simple construction interposed between the driving shaft 34 and the remainder of the driving means and the driven means so that in the event that any part of the latter should become stuck or jammed, further damage to the apparatus will not take place and so that the speed of rotation of the driven spool can vary while the speed of rotation of the driving means remains constant.

This driving means is here shown as used in conjunction with a removable magazine containing the spool element to be driven. This magazine is provided with mechanism whereby rotation of the spool, while the magazine is removed from or is not in proper position on the apparatus, is prevented. However, when the magazine is properly placed upon the apparatus, the mechanism which prevents rotation of the spool is rendered ineffective and simultaneously the driving means is connected to the spool for driving thereof.

With the spool rotation inhibiting mechanism as herein described accidental rotation of the spool, while the magazine is removed from the apparatus is prevented, but if such rotation is desired, it may, of course, be obtained merely by the exertion of inward manual pressure upon the disc 82.

It will be apparent that many changes may be made in the details of the construction as herein illustrated without departing from the spirit of the invention as sought to be defined in the appended claims.

I claim:

1. A magazine comprising a casing, a spool rotatably mounted therein, a disk mounted on the exterior of said casing and connected to said spool for rotation therewith by means of a shaft passing through a wall of said casing, said disk being provided with an opening, an annular plate mounted between said casing wall and said disc and surrounding said shaft, said casing wall having an opening in the outer surface thereof and said annular plate having a finger receivable in said opening so as to restrain said plate from movement in the direction of rotation of said disk, said finger being movable within said opening so as to permit said plate to move in a direction toward and away from said disk, resilient means active between said plate and said casing wall and effective to urge said plate toward said disk, and a downward projection on said plate engageable with the opening in said disk when said plate is urged toward said disk by the action of said spring and disengageable therefrom when said plate is moved toward said casing wall, as by engagement with an element outside said casing.

2. In the magazine of claim 1, two pairs of diametrically opposed openings in the outer surface of said casing wall, a pair of diametrically opposed fingers extending from said plate into a first pair of said openings, the other pair of said openings containing springs retained therein and defining said resilient means active between said plate and said casing wall.

3. In the magazine of claim 2, a second pair of diametrically opposed fingers projecting from said plate into said other pair of openings in said casing wall, said springs retained in said openings surrounding said fingers.

4. In the magazine of claim 1, a pair of diametrically opposed openings in the outer surface of said casing wall substantially in line with the outer periphery of said annular plate, a second pair of diametrically opposed openings in the outer surface of said casing wall substantially in line with the inner periphery of said annular plate, said downward projection on said plate extending from the inner periphery of said plate, said resilient means active between said plate and said casing wall being defined by springs retained within said second mentioned pair of openings in said casing wall, and a pair of diametrically opposed fingers extending upwardly from the outer periphery of said plate and received within said first pair of openings in said casing wall.

5. In the magazine of claim 4, a second pair of diametrically opposed fingers extending upwardly from the inner periphery of said plate into said second pair of openings in said casing wall, said springs retained within said openings surrounding said last mentioned fingers.

FREEMAN H. OWENS.

References Cited in the file of this patent

UNITED STATES PATENTS

| Number | Name | Date |
|---|---|---|
| 1,372,675 | Davis | Mar. 29, 1921 |
| 1,665,784 | Hornauer | Apr. 10, 1928 |
| 1,997,692 | Laudenbach | Apr. 16, 1935 |
| 2,161,341 | Fairbanks | June 6, 1939 |
| 2,206,032 | Foster | July 2, 1940 |

| Number | Name | Date |
|---|---|---|
| 2,321,812 | Heller et al. | June 15, 1943 |
| 2,343,961 | Del Valle | Mar. 14, 1944 |
| 2,349,018 | Tasker | May 16, 1944 |
| 2,379,690 | Cunningham | July 3, 1945 |
| 2,384,637 | Owens | Sept. 11, 1945 |
| 2,438,222 | Lear | Mar. 23, 1948 |
| 2,455,187 | Owens | Nov. 30, 1948 |
| 2,490,172 | Swannberg | Dec. 6, 1949 |
| 2,498,856 | Ianelli | Feb. 28, 1950 |
| 2,509,791 | Swanson | May 30, 1950 |